US012754684B2

(12) United States Patent
Strein et al.

(10) Patent No.: US 12,754,684 B2
(45) Date of Patent: Oct. 6, 2026

(54) RESILIENT CONTENT DISTRIBUTION NETWORK

(71) Applicant: Disney Enterprises, Inc., Burbank, CA (US)

(72) Inventors: Michael J. Strein, Bohemia, NY (US); David E. Potter, Altadena, CA (US); Patrick Daly, Memphis, TN (US); Ryan N. McCormick, Blauvelt, NY (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 19/243,317

(22) Filed: Jun. 19, 2025

(65) Prior Publication Data

US 2025/0315181 A1 Oct. 9, 2025

Related U.S. Application Data

(62) Division of application No. 18/197,636, filed on May 15, 2023, now Pat. No. 12,363,395.

(51) Int. Cl.
*G06F 3/06* (2006.01)

(52) U.S. Cl.
CPC ............ *G06F 3/064* (2013.01); *G06F 3/0604* (2013.01); *G06F 3/0652* (2013.01); *G06F 3/0679* (2013.01)

(58) Field of Classification Search
CPC ............... H04N 21/2358; H04N 21/25; H04N 21/26283; H04N 21/2665; H04N 21/2187
See application file for complete search history.

(56) References Cited

U.S. PATENT DOCUMENTS

| | | | | |
|---|---|---|---|---|
| 10,020,984 | B1 * | 7/2018 | Jork | H04L 41/0668 |
| 10,148,551 | B1 * | 12/2018 | Wood | H04L 45/123 |
| 10,320,658 | B2 * | 6/2019 | Sajassi | H04L 41/12 |
| 10,374,956 | B1 * | 8/2019 | Tracy | H04L 12/44 |
| 10,432,342 | B1 * | 10/2019 | Bathula | H04J 14/02122 |
| 10,432,519 | B2 * | 10/2019 | Baj | H04L 45/70 |
| 10,567,252 | B1 * | 2/2020 | Mukhopadhyaya | H04L 43/0805 |
| 2012/0017245 | A1 * | 1/2012 | Chen | H04N 21/6582 725/54 |
| 2015/0040172 | A1 * | 2/2015 | Zelesko | H04N 21/44227 725/110 |
| 2016/0248664 | A1 * | 8/2016 | Huang | H04L 45/64 |

(Continued)

*Primary Examiner* — Jason Salce
(74) *Attorney, Agent, or Firm* — Farjami & Farjami LLP

(57) ABSTRACT

In one implementation, a content distribution network includes a first plurality of communication paths for Internet Protocol (IP) signals, a router providing a second plurality of communication paths for non-IP signals, and a plurality of signal sources and a plurality of signal destinations. Each signal source is linked to a respective one signal destination by a respective first communication path of the first plurality of communication paths. Each of one or more of the signal sources designated as a protected source is further linked to the respective one signal destination by a second communication path of the second plurality of communication paths. The content distribution network distributes content in one of a first mode in which the first communication path and the second communication path carry the same content contemporaneously, or a second mode in which only the second communication path carries that content.

12 Claims, 5 Drawing Sheets

(56) References Cited

U.S. PATENT DOCUMENTS

| | | | | |
|---|---|---|---|---|
| 2020/0304409 | A1* | 9/2020 | Wang | H04L 45/741 |
| 2022/0109622 | A1* | 4/2022 | Yeh | H04L 67/10 |
| 2023/0308385 | A1* | 9/2023 | Patil | H04L 45/28 |

* cited by examiner

RESILIENT CONTENT DISTRIBUTION NETWORK

The present application is a Division of U.S. application Ser. No. 18/197,636, filed May 15, 2023, which is hereby incorporated by reference in its entirety into the present application.

BACKGROUND

Resiliency in Internet Protocol (IP) content distribution networks is usually achieved through established network topologies that provide protection, such as a mesh network or the use of red/blue redundant networks. Additionally, to protect the Broadcast Controller (BC), the system that controls the flow management of the network (bandwidth management through spines, leaves, and ports), the BC is often placed in a virtual machine (VM) stack where the process can be seamlessly migrated in case of failure. However, one key failure point still lies in the fact that the BC communicates with the network via the Network Control (NC) module specific to the network switches used in the topology of the network. At present, NC modules cannot communicate with more than one BC at any time, rendering this service a single point of failure. If the connection between the NC module and the BC is somehow severed, the BC no longer has control of the network. This can happen not only in failure scenarios, but also in maintenance or upgrade scenarios where the BC needs service.

Severance of the connection between the NC module and the network BC typically severs the connections between all sources of communication signals served by the network and their intended destinations. Depending upon the purpose supported by a particular network, those sources and destinations may be of more or less critical importance. For example, in a media production scenario, only some fraction of the communication sources and destinations may be absolutely necessary to provide continuity of content delivery to viewers, while in military applications or non-military security applications, substantially all communication sources and destinations may need to be accessible at all times.

Even if in the future it becomes possible for multiple NC modules to communicate with the same IP content distribution network, there will remain a need in the art for a network solution capable of ensuring that communications between sources and destinations of critical importance to continuity of content delivery remain effectively immune to substantially all potential sources of disruption to network communications.

DETAILED DESCRIPTION

Figure 1:
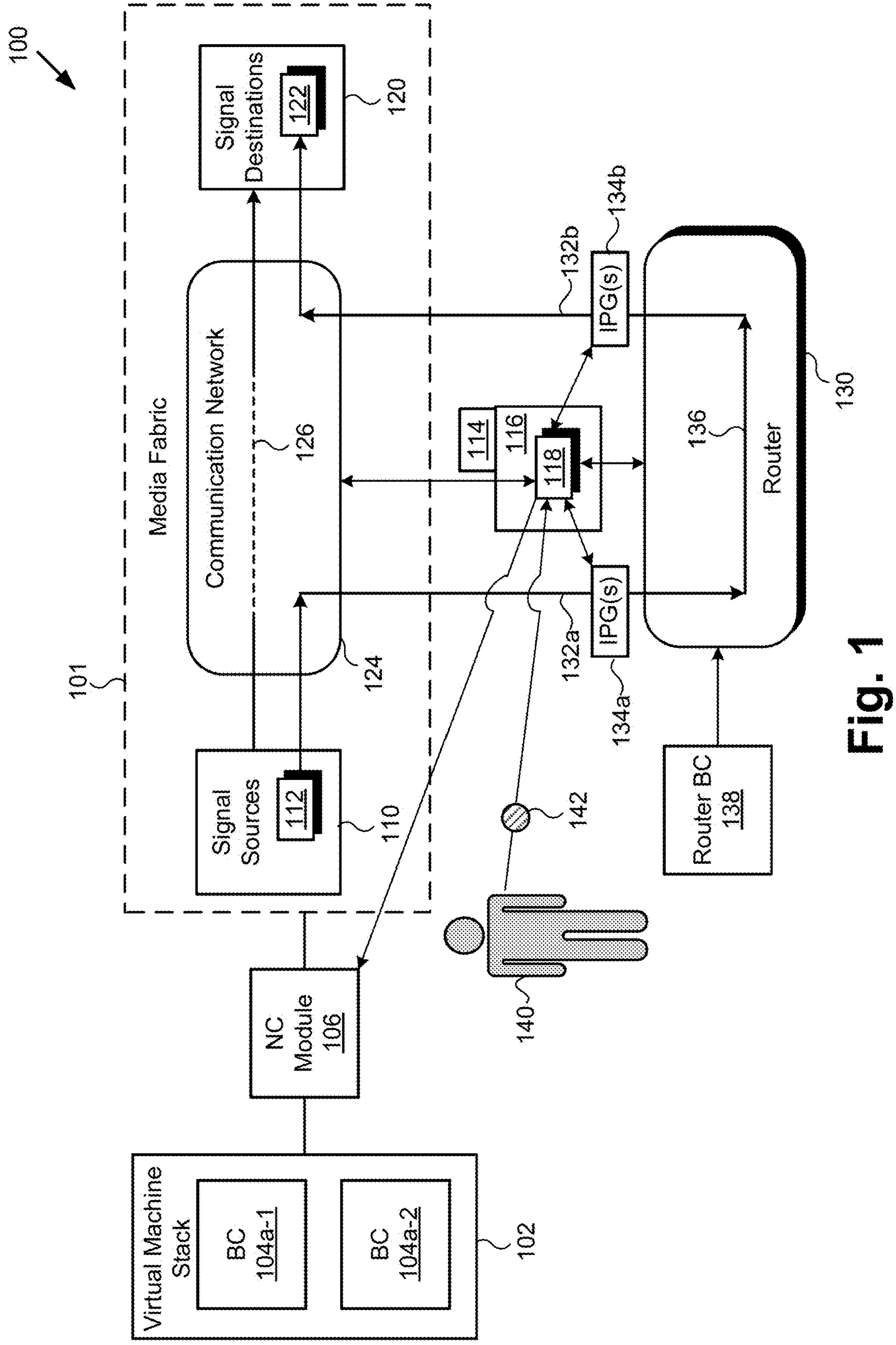
FIG. 1 shows a diagram of an exemplary resilient content distribution network, according to one implementation.

The following description contains specific c information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, resiliency in Internet Protocol (IP) communication networks is usually achieved through established network topologies that provide protection, such as a mesh network or the use of red/blue redundant networks. Additionally, to protect the Broadcast Controller (BC), the system that controls the flow management of the network (bandwidth management through spines, leaves, and ports), the BC is often placed in a virtual machine (VM) stack where the process can be seamlessly migrated in case of failure. However, one key failure point still lies in the fact that the BC communicates with the network via the Network Control (NC) module specific to the network switches used in the topology of the network. At present, NC modules cannot communicate with more than one BC at any time, rendering this service a single point of failure. If the connection between the NC module and the BC is somehow severed, the BC no longer has control of the network. This can happen not only in failure scenarios, but also in maintenance or upgrade scenarios where the BC needs service.

As also stated above, severance of the connection between a network NC module and the network BC typically severs the connections between all sources of communication signals served by the network and their intended destinations. Depending upon the purpose supported by a particular network, those sources and destinations may be of more or less critical importance. For example, in a media production scenario, only some fraction of the communication sources and destinations may be absolutely necessary to provide continuity of content delivery to viewers, while in military applications or non-military security applications, substantially all communication sources and destinations may need to be accessible at all times.

Furthermore, even if in the future it becomes possible for multiple NC modules to communicate with the same IP content distribution network, there will remain a need in the art for a network solution capable of ensuring that communications between sources and destinations of critical importance to continuity of content delivery remain effectively immune to substantially all potential sources of disruption to network communications.

The present application discloses resilient content distribution networks and methods for use by such resilient networks. To address the potential BC access failure scenario described above, as well as other sources of network disruption, a multi-pronged approach to achieve resiliency is used that includes a hybrid topology architecture using both standard networking techniques as well as dedicated video architecture methods. The present solution provides a resilient content distribution network in which the key sources and destinations of the network are protected from all known failure scenarios. According to concepts disclosed herein, distribution of media content is performed in parallel, using different content delivery carriage mechanisms, resulting advantageously in a network that does not rely exclusively on any one particular content distribution mode. Moreover, in some use cases, the present network resiliency solution may be implemented as automated systems and methods.

It is noted that, as defined for the purposes of the present application, the terms "automation," "automated," and "automating" refer to systems and processes that do not require the participation of a human system administrator. Although in some implementations the content sources and content destinations protected by the resiliency solution disclosed herein be selected or changed by a human system administrator or other user, that human involvement is optional. Thus, the methods described in the present application may be performed under the control of hardware processing components of the disclosed systems.

It is also noted that the types of content distributed using the resilient content distribution networks disclosed in the present application may include audio-video (AV) content having both audio and video components, such as a live camera feed for example, audio unaccompanied by video, and video unaccompanied by audio. In addition, or alternatively, in some implementations, the type of content distributed using the resilient content distribution networks disclosed in the present application may include may be or include digital representations of persons, fictional characters, locations, objects, and identifiers such as brands and logos, for example, which populate a virtual reality (VR), augmented reality (AR), or mixed reality (MR) environment. Moreover, that content may depict virtual worlds that can be experienced by any number of content users synchronously and persistently, while providing continuity of data such as personal identity, content user history, entitlements, possessions, payments, and the like. It is noted that the resilient networks disclosed herein may also be used to distribute content that is a hybrid of traditional audio-video and fully immersive VR/AR/MR experiences, such as interactive video.

FIG. 1 shows a diagram of exemplary resilient content distribution network 100, according to one implementation. As shown in FIG. 1, resilient content distribution network 100 includes IP media fabric 101 having a plurality of signal sources 110, a plurality of signal destinations 120, and communication network 124 providing a plurality of communication paths 126 for Internet Protocol (IP) signals, each of communication paths 126 linking one of signal sources 110 to a respective one of signal destinations 120. In addition, resilient content distribution network 100 includes virtual machine stack 102 including one or more of BCs 104*a*-1 and 104*a*-2, as well as NC module 106 coupled to one of BC 104*a*-1 or BC 104*a*-2 and IP media fabric 101. In some examples, BC 104*a*-2 may be omitted. In other examples, more than two BCs may be provided.

As further shown in FIG. 1, resilient content distribution network 100 also includes router 130 communicatively coupled to communication network 124 by a plurality of static communication paths including one or more static communication paths 132*a* (hereinafter "static communication path(s) 132*a*") and one or more static communication paths 132*b* (hereinafter "static communication path(s) 132*b*") through one or more IP gateways 134*a* (hereinafter "IPG(s) 134*a*") and one or more IP gateways 134*b* (hereinafter "IPG(s) 134*b*"). It is noted that IPG(s) 134*a* and 134*b* mediate conversion between a standardized IP media format, such as SMPTE 2110 for example, and various types of non-IP media transmission formats.

Router 130 is controlled by separate router BC 138 and provides one or more communication paths 136 (hereinafter "communication path(s) 136") for non-IP signals further linking each of one or more of signal sources 110 designated as a protected source 112 (hereinafter "protected source(s) 112") with a respective one of signal destinations 120 designated as one or more protected destinations 122 (hereinafter "protected destination(s) 122"). Thus, each protected source(s) 112 is persistently linked to a respective one of protected destination(s) 122 by two signal paths, a first signal path provided by communication network 124 for IP signals, and a second signal path through router 130 for non-IP signals, such as serial digital interface (SDI) signals, for example.

In addition to the features described above, resilient content distribution system 100 includes hardware processor 114, and system memory 116 implemented as a computer-readable non-transitory storage medium. According to the present exemplary implementation, system memory 116 stores software code 118 communicatively coupled to NC module 106, communication network 124, router 130, and IPG(s) 134*a* and 134*b*. Also shown in FIG. 1 are user 140 of resilient content distribution network 100 and selection data 142 identifying protected source(s) 112 and protected destination(s) 122 as such.

It is noted that system memory 116 may take the form of any computer-readable non-transitory storage medium. The expression "computer-readable non-transitory storage medium," as defined in the present application, refers to any medium, excluding a carrier wave or other transitory signal that provides instructions to hardware processor 114. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

Hardware processor 114 may include multiple hardware processing units, such as one or more central processing units, one or more graphics processing units, and one or more tensor processing units, one or more field-programmable gate arrays (FPGAs), custom hardware for machine-learning training or, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out arithmetic and logical operations, as well as a Control Unit (CU) for retrieving programs, such as software code 118, from system memory 116, while a GPU may be implemented to reduce the processing overhead of the CPU by performing computationally intensive graphics or other processing tasks. A TPU is an application-specific integrated circuit (ASIC) configured specifically for AI applications such as ML modeling.

Signal sources 110 may include tens, hundreds, or thousands of signal sources, while signal destinations 120 may include tens, hundreds, or thousands of signal destinations. In implementations in which signal sources 110 and signal destinations 120 each number less than one hundred, for example, it may be advantageous or desirable to designate all or more than half of signal sources 110 as protected source(s) 112, and all or more than half of signal destinations 120 as protected destination(s) 122. However, as the number of signal sources 110 and signal destinations 120 increase, it may become preferable to designate only a subset of signal sources 110 and signal destinations, such as twenty-five percent or less, or ten percent or less of signal sources 110 and signal destinations 120 as respective protected source(s) 112 and protected destination(s) 122. Moreover, it is noted that some, many, or most of signal sources 110 and signal destinations 120 may not be critical to a particular use case supported by content distribution network 100. For example, and as indicated above, in a media production use case, only some relatively small fraction of signal sources 110 and signal destinations 120, such as ten percent or less, may be absolutely necessary to provide continuity of content delivery to viewers.

It is further noted that the number of protected source(s) 112 and protected destination(s), as well as the identifier of each of protected source(s) 112 and protected destination(s) 122 are selectable by user 140 of resilient content distribution network 100, and may vary on a case-by-case basis. In other words, in one use case a certain number of particular signal sources 110 and signal destinations 120 may be selected and designated as protected source(s) 112 and protected destination(s) 122, while in another use case another number including other signal sources 110 and other signal destinations may be selected and designated as protected source(s) 112 and protected destination(s) 122.

Communication network 124 providing communication paths 126 for IP signals may be implemented as a software-defined network, for example, as known in the art. In various implementations, router 130 may take the form of a single router, a primary (blue) router and a redundant (red) router, or a plurality of routers operating contemporaneously in parallel. As noted above, in some implementations, router 130 may be configured to carry SDI signals. In other implementations, router 130 may take the form of one or more routing devices that can switch signals in multiple modes rather than exclusively in IP. It is noted that in some implementations in which router 130 is configured for multi-mode switching, router 130 may include integrated IPGs, thereby obviating the need for discrete IPG(s) 134*a* and 134*b*.

By way of overview of the functionality of resilient content distribution network 100: first, a selection is made of the key sources and destinations among signal sources 110 and signal destinations 120 that need to be protected as protected source(s) 112 and protected destination(s) 122. It is noted that a large IP media fabric may include thousands of signal sources 110 and signal destinations 120, and protecting every one of those can be unrealistic. As noted above, depending on the number of signal sources 110 and signal destinations 120 included in IP media fabric 101, a reasonable number of protected source(s) 112 and protected destination(s) may be twenty-five percent or less, or ten percent or less of signal sources 110 and signal destinations 120.

Next, static communication path(s) 132*a* and static communication path(s) 132*b* are enabled in IP media fabric 101. Those static communication path(s) 132*a* and static communication path(s) 132*b* may be programmed by software code 118, executed by hardware processor 114, through NC module 106. BC 104*a*-1 or 104*a*-2 is aware of those static communication paths, reserving the bandwidth and pathing for static communication path(s) 132*a* and static communication path(s) 132*b*. This essentially doubles the network resources allocated for protected source(s) 112 and protected destination(s) 122 (bandwidth and allocated ports), but advantageously makes them always available.

Static communication path(s) 132*a* are brought out to IPG(s) 134*a*, which convert the multicast IP signals to non-IP signals no longer in the IP realm. The non-IP signals are then transmitted along communication path(s) 136 provided by router 130, converted back to IP signals by IPG(s) 134*b*, and brought back to IP media fabric 101 through static communication path(s) 132*b* to protected destination(s) 122.

It is noted that any entity requiring control of protected sources 112 and protected destinations 122 would typically have a corresponding emergency control panel that could be accessed to route signals in the failure scenario in which communications between NC module 106 and BC 104*a*-1 or 104*a*-2 are severed. Thus, in summary, resilient content distribution network 100 includes signal sources 110, signal destinations 120, communication network 124 providing communication paths 126 for IP signals, and router 130 providing communication path(s) 136 for non-IP signals. Each of signal sources 110 is linked to a respective one of signal destinations 120 by a respective first communication path among communication paths 126. Each of protected source(s) 112 of signal sources 110 is further linked to one of protected destination(s) 122 by a respective second communication path among communication path(s) 136 for non-IP signals, provided by router 130. Moreover, resilient content distribution network 100 is configured to distribute content in one of a first mode in which the first communication path and the second communication path linking each of protected source(s) 112 to the respective one of protected destination(s) 122 carry the same content contemporaneously, or a second mode in which only the second communication path carries that content. As noted above, the content carried by the first and second paths, or the second paths alone may be or include AV content, such as a camera feed.

Figure 2:
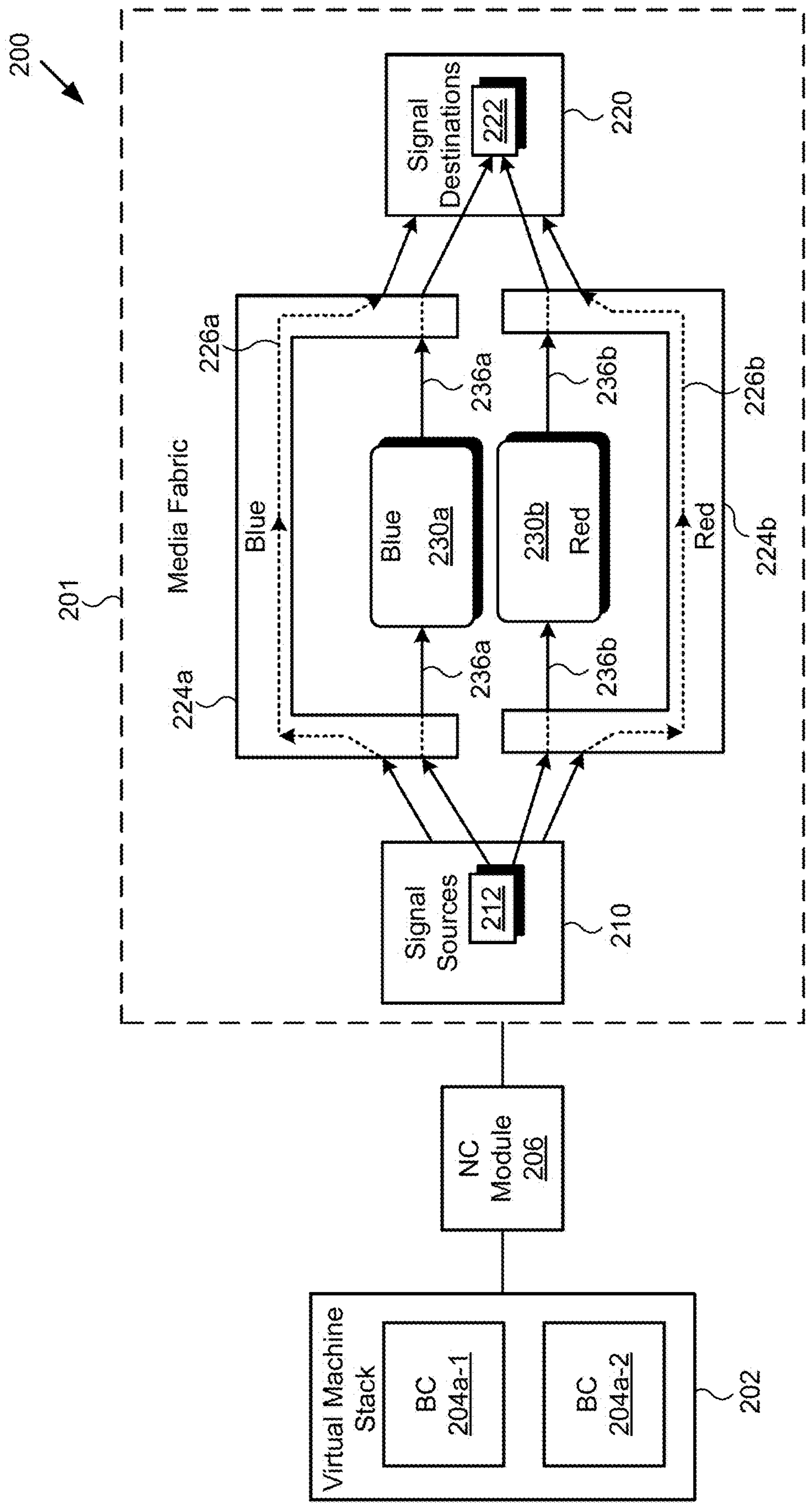
FIG. 2 shows a diagram of an exemplary resilient content distribution network, according to another implementation.

FIG. 2 shows a diagram of exemplary resilient content distribution network 200, according to another implementation. As shown in FIG. 2, resilient content distribution network 200 includes IP media fabric 201 having a plurality of signal sources 210, a plurality of signal destinations 220, primary (blue) communication network 224*a* providing a plurality of communication paths 226*a* for IP signals, and redundant (red) communication network 224*b* providing a plurality of redundant communication paths 226*b* for the IP signals, each of communication paths 226*a* and redundant communication paths 226*b* linking one of signal sources 210 to a respective one of signal destinations 220. In addition, resilient content distribution network 200 includes virtual machine stack 202 including one or more of BCs 204*a*-1 and 204*a*-2, as well as NC module 206 coupled to one of BC 204*a*-1 or BC 204*a*-2 and IP media fabric 201.

As further shown in FIG. 2, resilient content distribution network 200 also includes primary (blue) router 230*a* providing one or more communication paths 236*a* (hereinafter communication path(s) 236*a*") for non-IP signals further linking each of one or more of signal sources 210 designated as a protected source 212 (hereinafter "protected source(s) 212") with a respective one of signal destinations 220 designated as a protected destinations (hereinafter "protected destination(s) 222"). In addition, resilient content distribution network 200 includes redundant (red) router 230*b* providing one or more redundant communication paths 236*b* (hereinafter "redundant communication path(s) 236*b*") for the non-IP signals also linking each of one or more of protected source(s) 212 with a respective one of protected destination(s) 222. Thus, each of protected source(s) 212 is persistently linked to a respective one of protected destination(s) 222 by two signal paths, a first signal path provided by communication network 224*a* or 224*b* for IP signals, and a second signal path through router 230*a* or 230*b* for non-IP signals.

Virtual machine stack 202 including one or more of BCs 204$a$-1 and 204$a$-2 corresponds in general to virtual machine stack 102 including one or more of BCs 104$a$-1 and 104$a$-2, in FIG. 1. Thus, virtual machine stack 202 including one or more of BCs 204$a$-1 and 204$a$-2 may share any of the characteristics attributed to virtual machine stack 102 including one or more of BCs 104$a$-1 and 104$a$-2 by the present disclosure, and vice versa. NC module 206, signal sources 210 including protected source(s) 212, and signal destinations 220 including protected destination(s) 222 correspond respectively in general to NC module 106, signal sources 110 including protected source(s) 112, and signal destinations 120 including protected destination(s) 122, in FIG. 1. Consequently, NC module 206, signal sources 210 including protected source(s) 212, and signal destinations 220 including protected destination(s) 222 may share any of the characteristics attributed to respective NC module 106, signal sources 110 including protected source(s) 112, and signal destinations 120 including protected destination(s) 122 by the present disclosure, and vice versa.

Each of primary communication network 224$a$ providing communication paths 226$a$ for IP signals and redundant communication network 224$b$ providing redundant communication paths 226$b$ for the IP signals, in FIG. 2, correspond in general to communication network 124 providing communication paths 126 for IP signals in FIG. 1. Thus, communication networks 224$a$ and 224$b$ providing communication paths 226$a$ and redundant communication paths 226$b$ may share any of the characteristics attributed to communication network 124 providing communication paths 126 by the present disclosure, and vice versa. Moreover, each of primary router 230$a$ providing communication path(s) 236$a$ for non-IP signals and redundant router 230$b$ providing redundant communication path(s) 236$b$ for the non-IP signals, in FIG. 2, corresponds in general to router 130 providing communication path(s) 136 for non-IP signals in FIG. 1. Thus, routers 230$a$ and 230$b$ providing respective communication path(s) 236$a$ and redundant communication path(s) 236$b$ may share any of the characteristics attributed to router 130 providing communication path(s) 136 by the present disclosure, and vice versa.

It is noted that certain features shown in FIG. 1, while they may be included in resilient content distribution system 200, are not shown in FIG. 2 in the interests of conceptual clarity. Nevertheless, resilient content distribution system 200 may include features corresponding respectively to static communications path(s) 132$a$ and static communications path(s) 132$b$, IPG(s) 134$a$ and IPG(s) 134$b$, router BC 138, hardware processor 114, system memory 116 storing software code 118, user 140, and selection data 142 identified above by reference to FIG. 1.

In a manner analogous to that described above by reference to FIG. 1, in FIG. 2 each of signal sources 210 is linked to a respective one of signal destinations 220 by a respective first communication path among communication paths 226$a$ and redundant communication paths 226$b$. Each of protected source(s) 212 of signal sources 210 is further linked to the respective one of signal destinations 220 (one of protected destination(s) 222) by a respective second communication path among communication path(s) 236$a$ or redundant communication path(s) 236$b$ provided by respective routers 230$a$ and 230$b$. Moreover, like resilient content distribution network 100, resilient content distribution network 200 is configured to distribute content in one of a first mode in which the first communication path and the second communication path linking each of protected source(s) 212 to the respective one of protected destination(s) 222 carry the same content contemporaneously, or a second mode in which only the second communication path carries that content.

Figure 3:
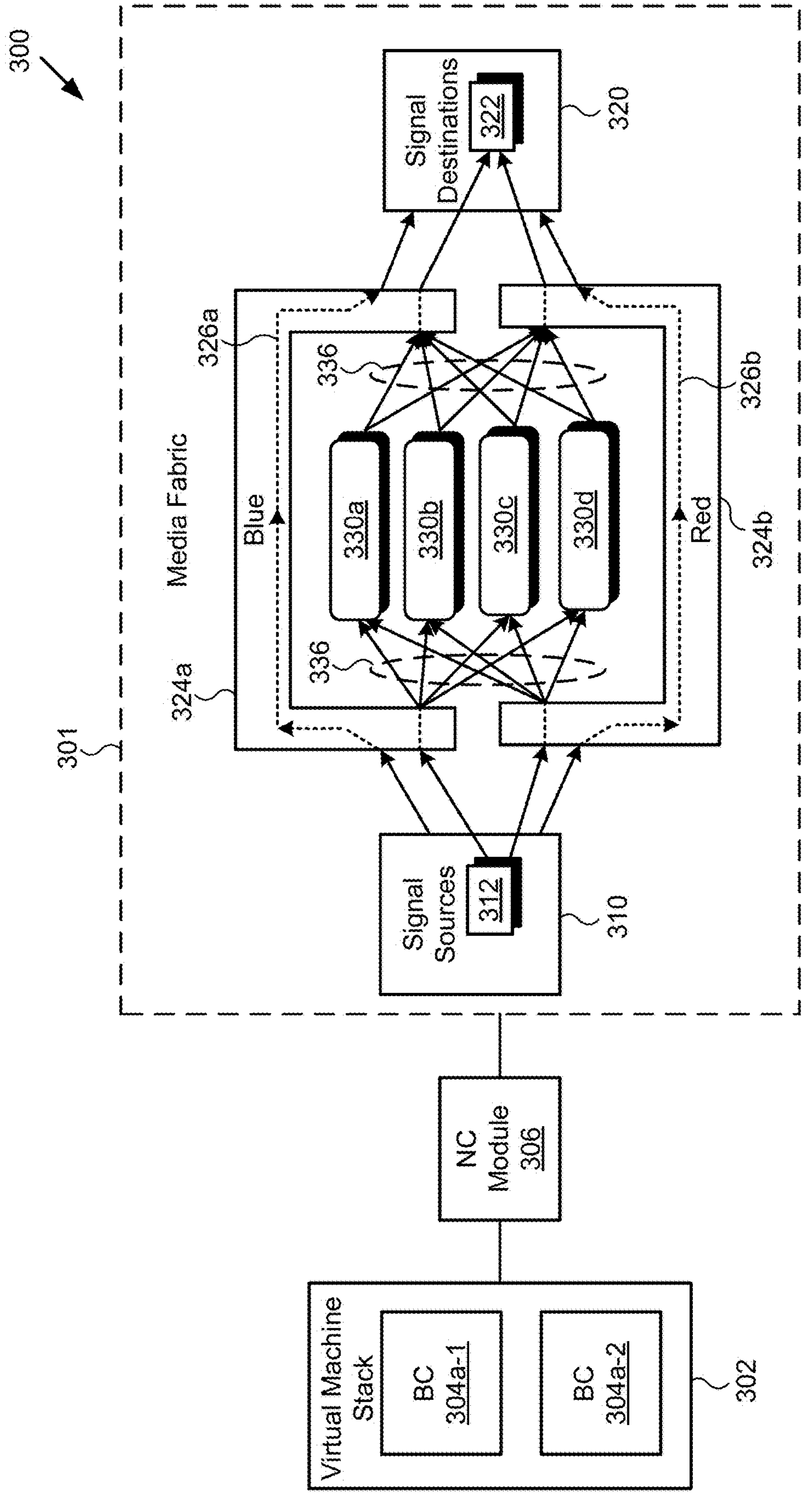
FIG. 3 shows a diagram of an exemplary resilient content distribution network, according to another implementation.

FIG. 3 shows a diagram of exemplary resilient content distribution network 300, according to yet another implementation. As shown in FIG. 3, resilient content distribution network 300 includes IP media fabric 301 having a plurality of signal sources 310, a plurality of signal destinations 320, primary (blue) communication network 324$a$ providing a plurality of communication paths 326$a$ for IP signals, and redundant (red) communication network 324$b$ providing a plurality of redundant communication paths 326$b$ for the IP signals, each of communication paths 326$a$ and redundant communication paths 326$b$ linking one of signal sources 310 to a respective one of signal destinations 320. In addition, resilient content distribution network 300 includes virtual machine stack 302 including one or more of BCs 304$a$-1 and 304$a$-2, as well as NC module 306 coupled to one of BC 304$a$-1 or BC 304$a$-2 and IP media fabric 301.

As further shown in FIG. 3, resilient content distribution network 300 also includes a plurality of routers 330$a$, 330$b$, 330$c$, and 330$d$ (hereinafter "routers 330$a$-330$d$") providing a plurality of communication paths 336 for non-IP signals further linking each of one or more of signal sources 310 designated as a protected source 312 (hereinafter "protected source(s) 312") with a respective one of signal destinations 320 designated as one or more protected destinations 322 (hereinafter "protected destination(s) 322"). Thus, each of protected source(s) 312 is persistently linked to a respective one of protected destination(s) 322 by two signal paths, a first signal path provided by communication network 324$a$ or 324$b$ for IP signals, and a second signal path through one of routers 330$a$-330$d$ for non-IP signals.

It is noted that, according to the exemplary implementations shown in FIG. 3, routers 330$a$-330$d$ are implemented in parallel and each of routers 330$a$-330$d$ operates contemporaneously with the others of routers 330$a$-330$d$ to provide communication paths 336 for non-IP signals. It is further noted that each of routers 330$a$-330$d$ may provide a subset of communication paths 336 such that some of communication paths 336 are routed through router 330$a$, some others of communication paths 336 are routed through router 330$b$, and so forth. It is also noted that although resilient content distribution system 300 is shown to include four routers, that representation is provided merely by way of example. In other implementations, resilient content distribution system 300 may include as few as two routers in parallel, three routers in parallel, or more than four routers in parallel.

Virtual machine stack 302 including one or more of BCs 304$a$-1 and 304$a$-2 corresponds in general to virtual machine stack 102 including BCs 104$a$-1 and 104$a$-2, in FIG. 1. Thus, virtual machine stack 302 including one or more of BCs 304$a$-1 and 304$a$-2 may share any of the characteristics attributed to virtual machine stack 102 including one or more of BCs 104$a$-1 and 104$a$-2 by the present disclosure, and vice versa. NC module 306, signal sources 310 including protected source(s) 312, signal destinations 320 including protected destination(s) 322, and communication paths 336 for non-IP signals correspond respectively in general to NC module 106, signal sources 110 including protected source(s) 112, signal destinations 120 including protected destination(s) 122, and communication path(s) 136 for non-IP signals, in FIG. 1. Consequently, NC module 306, signal sources 310 including protected source(s) 312, signal destinations 320 including protected destination(s) 322, and communication paths 336 for non-IP signals may share any of the characteristics attributed to respective NC module 106, signal sources 110 including protected source(s) 112, signal destinations 120 including protected destination(s) 122, and communication path(s) 136 for non-IP signals by the present disclosure, and vice versa.

Each of primary communication network 324*a* providing communication paths 326*a* for IP signals and redundant communication network 324*b* providing redundant communication paths 326*b* for the IP signals, in FIG. 3, correspond in general to communication network 124 providing communication paths 126 for IP signals in FIG. 1. Thus, communication networks 324*a* and 324*b* providing communication paths 326*a* and redundant communication paths 326*b* may share any of the characteristics attributed to communication network 124 providing communication paths 126 by the present disclosure, and vice versa. Moreover, each of routers 330*a*-330*d* providing communication paths 336 for non-IP signals, in FIG. 3, corresponds in general to router 130 providing communication path(s) 136 for non-IP signals in FIG. 1. Thus, routers 330*a*-330*d* may share any of the characteristics attributed to router 130 by the present disclosure, and vice versa.

It is noted that certain features shown in FIG. 1, while they may be included in resilient content distribution system 300, are not shown in FIG. 3 in the interests of conceptual clarity. Nevertheless, resilient content distribution system 300 may include features corresponding respectively to static communications path(s) 132*a* and static communications path(s) 132*b*, IPG(s) 134*a* and IPG(s) 134*b*, router BC 138, hardware processor 114, system memory 116 storing software code 118, user 140, and selection data 142 identified above by reference to FIG. 1.

In a manner analogous to that described above by reference to FIG. 1, in FIG. 3 each of signal sources 310 is linked to a respective one of signal destinations 320 by a respective first communication path among communication paths 326*a* and redundant communication paths 326*b*. Each of protected source(s) 312 of signal sources 310 is further linked to the respective one of signal destinations 320 (one of protected destination(s) 322) by a respective second communication path among communication paths 336 provided by routers 330*a*-330*d*. Moreover, like resilient content distribution network 100, resilient content distribution network 300 is configured to distribute content in one of a first mode in which the first communication path and the second communication path linking each of protected source(s) 312 to the respective one of protected destination(s) 322 carry the same content contemporaneously, or a second mode in which only the second communication path carries that content.

Figure 4:
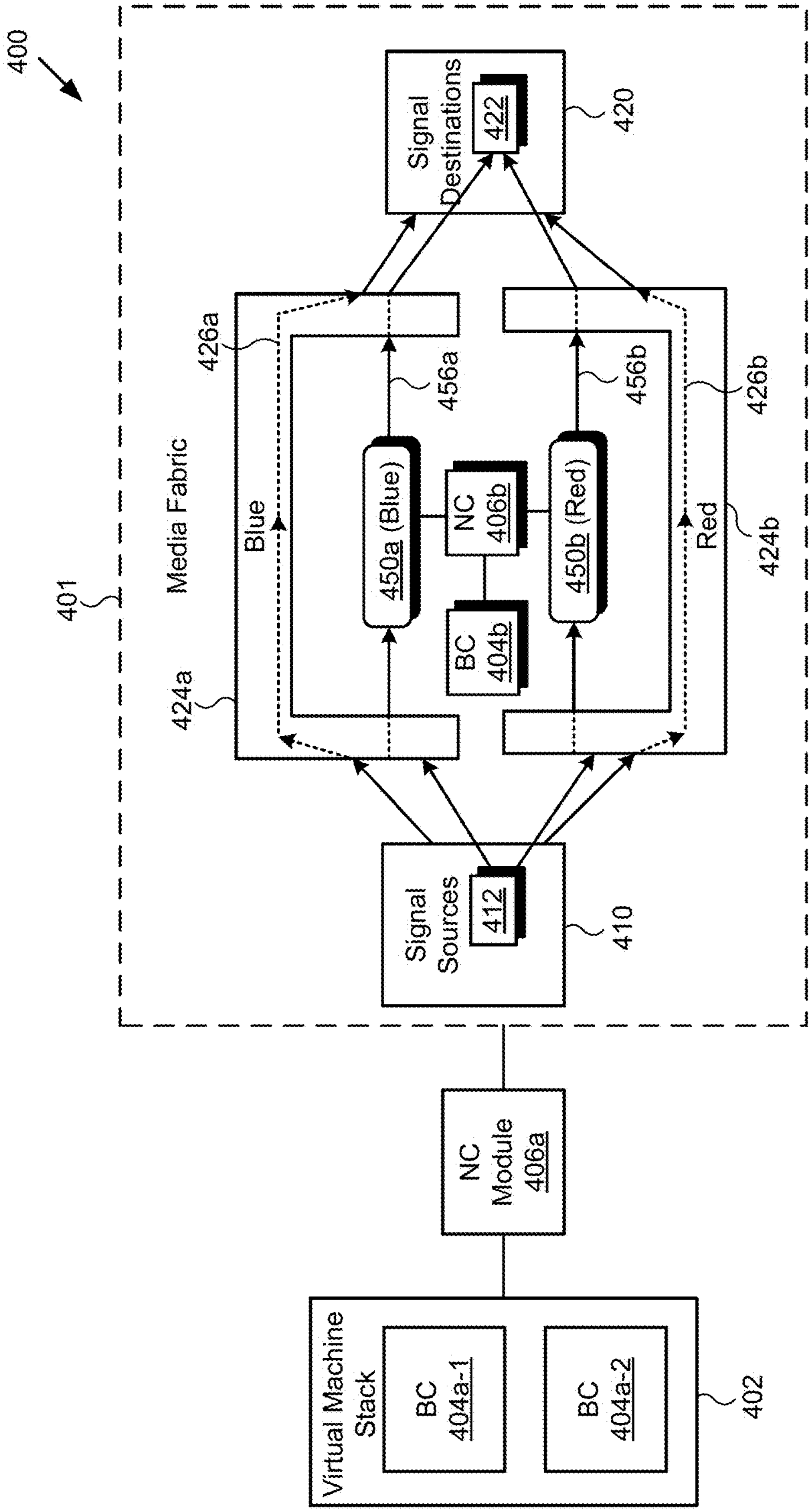
FIG. 4 shows a diagram of an exemplary resilient content distribution network, according to yet another implementation.

FIG. 4 shows a diagram of exemplary resilient content distribution network 400, according to another implementation. As shown in FIG. 4, resilient content distribution network 400 includes IP media fabric 401 having a plurality of signal sources 410, a plurality of signal destinations 420, primary (blue) first communication network 424*a* providing a plurality of communication paths 426*a* for IP signals, and redundant (red) first communication network 424*b* providing a plurality of redundant communication paths 426*b* for the IP signals, each of communication paths 426*a* and redundant communication paths 426*b* linking one of signal sources 410 to a respective one of signal destinations 420.

In addition, resilient content distribution network 400 includes virtual machine stack 402 including one or more first BCs 404*a*-1 and 404*a*-2, as well as first NC module 406*a* coupled to one of BC 404*a*-1 or BC 404*a*-2 and IP media fabric 401. It is noted that primary (blue) first communication network 424*a* and redundant (red) first communication network 424*b* are supported by a first BC, i.e., one of BC 404*a*-1 or BC 404*a*-2, and first NC module 406*a*.

As further shown in FIG. 4, resilient content distribution network 400 also includes primary (blue) second communication network 450*a* providing one or more communication paths 456*a* (hereinafter communication path(s) 456*a*") for IP signals further linking each of one or more of signal sources 410 designated as a protected source 412 (hereinafter "protected source(s) 412") with a respective one of signal destinations 420 designated as a protected destinations (hereinafter "protected destination(s) 422"). In addition, resilient content distribution network 400 includes redundant (red) second communication network 450*b* providing one or more redundant communication paths 456*b* (hereinafter "redundant communication path(s) 456*b*") for the IP signals also linking each of one or more of protected source(s) 412 with a respective one of protected destination(s) 422.

Thus, each of protected source(s) 412 is persistently linked to a respective one of protected destination(s) 422 by two signal paths, a first signal path provided by first communication network 424*a* or 424*b* for IP signals, and a second signal path through second communication network 450*a* or 450*b* for IP signals. It is noted that primary (blue) second communication network 450*a* and redundant (red) second communication network 450*b* are supported by a second BC, i.e., BC 404*b*, and second NC module 406*b*.

Virtual machine stack 402 including one or more of first BCs 404*a*-1 and 404*a*-2 corresponds in general to virtual machine stack 102 including one or more of BCs 104*a*-1 and 104*a*-2, in FIG. 1. Thus, virtual machine stack 402 including one or more of first BCs 404*a*-1 and 404*a*-2 may share any of the characteristics attributed to virtual machine stack 102 including one or more of BCs 104*a*-1 and 104*a*-2 by the present disclosure, and vice versa. First NC module 406*a*, signal sources 410 including protected source(s) 412, and signal destinations 420 including protected destination(s) 422 correspond respectively in general to NC module 106, signal sources 110 including protected source(s) 112, and signal destinations 120 including protected destination(s) 122, in FIG. 1. Consequently, NC module 406, signal sources 410 including protected source(s) 412, and signal destinations 420 including protected destination(s) 422 may share any of the characteristics attributed to respective NC module 106, signal sources 110 including protected source(s) 112, and signal destinations 120 including protected destination(s) 122 by the present disclosure, and vice versa.

Each of primary first communication network 424*a* providing communication paths 426*a* for IP signals and redundant first communication network 424*b* providing redundant communication paths 426*b* for the IP signals, in FIG. 4, correspond in general to communication network 124 providing communication paths 126 for IP signals in FIG. 1. Thus, first communication networks 424*a* and 424*b* providing communication paths 426*a* and redundant communication paths 426*b* may share any of the characteristics attributed to communication network 124 providing communication paths 126 by the present disclosure, and vice versa.

It is noted that certain features shown in FIG. 1, while they may be included in resilient content distribution system 400, are not shown in FIG. 4 in the interests of conceptual clarity. Nevertheless, resilient content distribution system 200 may include features corresponding respectively to static communications path(s) 132*a* and static communications path(s) 132*b*, hardware processor 114, system memory 116 storing software code 118, user 140, and selection data 142 identified above by reference to FIG. 1. However, it is noted that because primary second communication network 450*a* and redundant second communication network 450*b* are, like primary first communication network 424*a* and redundant first communication network 424*b*, configured to carry IP signals, IPGs can be omitted from content distribution system 400.

According to the exemplary implementations shown in FIG. 4, each of signal sources 410 is linked to a respective one of signal destinations 420 by a respective first communication path among communication paths 426*a* and redundant communication paths 426*b* provided by respective primary first communication network 424*a* and redundant first communication network 424*b*. Each of protected source(s) 412 of signal sources 410 is further linked to the respective one of signal destinations 420 (one of protected destination(s) 422) by a respective second communication path among communication path(s) 456*a* or redundant communication path(s) 456*b* provided by respective primary second communication network 450*a* and redundant second communication network 450*b*. Moreover, like resilient content distribution network 100, resilient content distribution network 400 is configured to distribute content in one of a first mode in which the first communication path and the second communication path linking each of protected source(s) 412 to the respective one of protected destination(s) 422 carry the same content contemporaneously, or a second mode in which only the second communication path carries that content.

Figure 5:
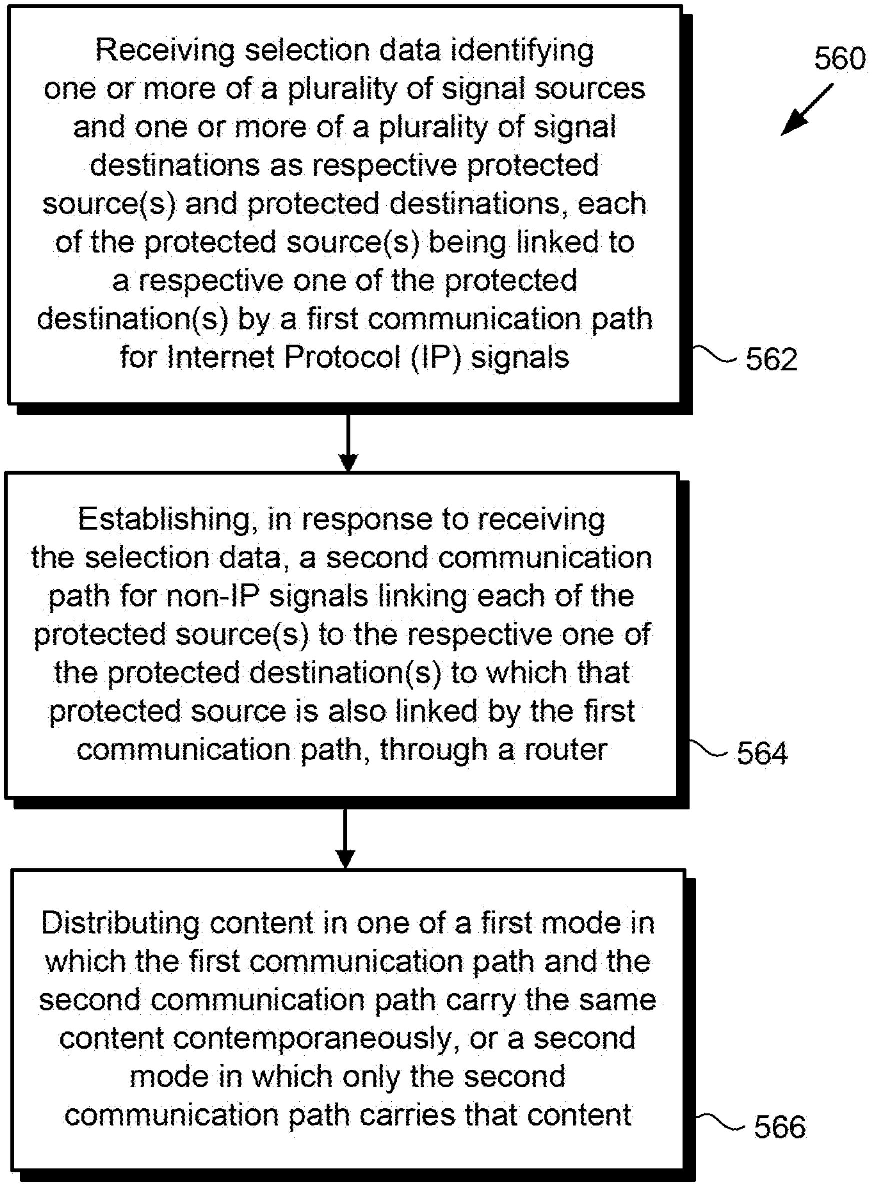
FIG. 5 shows a flowchart presenting an exemplary method for use by a resilient content distribution network, according to one implementation.

The functionality of software code 118 will be further described by reference to FIG. 5. FIG. 5 shows flowchart 560 presenting an exemplary method for use by a resilient content distribution network, according to one implementation. With respect to the method outlined in FIG. 5, it is noted that certain details and features have been left out of flowchart 560 in order not to obscure the discussion of the inventive features in the present application.

Referring to FIG. 5, with further reference specifically to the implementation of resilient content distribution network 100 shown in FIG. 1, flowchart 560 includes receiving selection data 142 identifying one or more of signal sources 110 and one or more of signal destinations 120 as respective protected source(s) 112 and protected destination(s) 122, each of protected source(s) 112 being linked to a respective one of protected destination(s) 122 by a first communication path of communication paths 126 for IP signals (action 562). As shown in FIG. 1, selection data 142 may be received as an input to resilient content distribution network 100 from user 140. As further shown in FIG. 1, selection data 142 may be received in action 562 by software code 118, executed by hardware processor 114.

Continuing to refer to FIGS. 1 and 5 in combination, the method outlined by flowchart 560 further includes establishing, in response to receiving selection data 142, a second communication path 136 for non-IP signals linking each of protected source(s) 112 to the respective one of protected destination(s) 122 to which that protected source is also linked by the first communication path, through router 130 (action 564). As noted above, in some implementations router 130 may be configured to carry SDI signals. In other use cases, router 130 may be implemented as a routing device that can switch signals in multiple modes rather than exclusively in IP. As noted above, in some implementations in which router 130 is configured for multi-mode switching, router 130 may include integrated IPGs, thereby obviating the need for discrete IPG(s) 134*a* and 134*b*. Moreover, in some implementations router 130 may be implemented using a plurality of routers, either in the interests redundancy, as shown in and described by reference to FIG. 2, or in parallel, as shown in and described by reference to FIG. 3. Establishing the second communication path for non-IP signals linking each of protected source(s) 112 to the respective one of protected destination(s), in action 564, may be performed by software code 118, executed by hardware processor 114, and using router 130, IPG(s) 134*a* and IPG(s) 134*b*, and NC module 106 to program static communication path(s) 132*a* and static communication path(s) 132*b*, as noted above.

Continuing to refer to FIGS. 1 and 5 in combination, the method outlined by flowchart 560 further includes distributing content in one of a first mode in which the first communication path and the second communication path linking each of protected source(s) 112 to the respective one of protected destination(s) 122 carry the same content contemporaneously, or a second mode in which only the second communication path carries that content (action 566). It is noted that actions 564 and 566 advantageously serve to avert the failure scenario that can occur in conventional content distribution networks when the communication link between NC module 106 and the particular BC controlling the network is interrupted, thereby rendering the resilient content distribution networks disclosed herein more robust than such conventional networks. Action 566 may be performed by software code 118, executed by hardware processor 114. With respect to the method outlined by flowchart 560, it is emphasized that actions 562, 564, and 566 may be performed in an automated process from which human involvement may be omitted.

It is noted that although in the event of failure of both the first and second communication paths, the system, despite its inherent resiliency, would be in a failure state. However, the likelihood of such a concurrent failure of the first and second communication paths is substantially reduced relative to conventional redundant systems because, according to the concepts disclosed herein, distribution of media content is performed in parallel using different content delivery carriage mechanisms, resulting advantageously in a network that does not rely exclusively on any one particular content distribution mode.

Thus, the present application discloses resilient content distribution networks and methods for use by such resilient networks. Advantages of the present resiliency solution over conventional approaches include the fact that the network resiliency is part of the overall IP media fabric and all signal sources and signal destinations are eligible for protection. Furthermore, no manual intervention is required to map alternative communication paths in case of failure of an NC module to communicate with the network BC.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A content distribution network comprising:

a first communication network providing a first plurality of communication paths for Internet Protocol (IP) signals, the first communication network supported by a first broadcast controller (BC) and a first network control (NC) module;

a second communication network providing a second plurality of communication paths for IP signals, the second communication network supported by a second BC and a second NC module; and a plurality of signal sources and a plurality of signal destinations, each signal source of the plurality of signal sources being linked to a respective one signal destination of the plurality of signal destinations by a respective first communication path of the first plurality of communication paths;

wherein a subset of one or more signal sources of the plurality of signal sources is identified as a protected source, each of the one or more protected sources being further linked to the respective one signal destination by a second communication path of the second plurality of communication paths;

wherein the content distribution network is configured to distribute content in one of a first mode in which the first communication path and the second communication path carry a same content contemporaneously, or a second mode in which only the second communication path carries the same content.

2. The content distribution network of claim 1, wherein the one or more protected sources comprise less than or equal to twenty-five percent of the plurality of signal sources.

3. The content distribution network of claim 1, wherein the same content comprises audio-video (AV) content.

4. The content distribution network of claim 1, wherein the same content comprises a live camera feed.

5. The content distribution network of claim 1, wherein the one or more protected sources comprise more than half of the plurality of signal sources.

6. The content distribution network of claim 1, wherein the one or more protected sources and the respective one signal destination are further linked by the second communication path are selectable by a user of the content distribution network.

7. A method for use by a content distribution network having a hardware processor and a system memory storing a software code, the content distribution network being communicatively coupled to a plurality of signal sources and a plurality of signal destinations, the content distribution network including a first communication network providing a first plurality of communication paths for Internet Protocol (IP) signals, the first communication network supported by a first broadcast controller (BC) and a first network control (NC) module, the content distribution network further including a second communication network providing a second plurality of communication paths for IP signals, the second communication network supported by a second BC and a second NC module, the method comprising:

receiving, by the software code executed by the hardware processor, a selection data identifying one or more signal sources of the plurality of signal sources as a protected source, and one or more signal destinations of the plurality of signal destinations as a protected destination, each of the one or more protected sources being linked to a respective one of the one or more protected destinations by a first communication path of the first plurality of communication paths;

identifying, by the software code executed by the hardware processor, a subset of one or more signal sources of the plurality of signal sources as a protected source, each of the one or more protected sources being further linked to the respective one signal destination by a second communication path of the second plurality of communication paths;

distributing content, by the software code executed by the hardware processor, in one of a first mode in which the first communication path and the second communication path carry a same content contemporaneously, or a second mode in which only the second communication path carries the same content.

8. The method of claim 7, wherein the one or more protected sources comprise less than or equal to twenty-five percent of the plurality of signal sources.

9. The method of claim 7, wherein the same content comprises audio-video (AV) content.

10. The method of claim 7, wherein the same content comprises a live camera feed.

11. The method of claim 7, wherein the one or more protected sources comprise more than half of the plurality of signal sources.

12. The method of claim 7, wherein the one or more protected sources and the respective one signal destination are further linked by the second communication path are selectable by a user of the content distribution network.

* * * * *